(12) United States Patent
Mullis (10) Patent No.: US 12,287,254 B2
(45) Date of Patent: Apr. 29, 2025

(54) METHOD FOR DETERMINING A PRESSURE IN A PRESSURE MEASUREMENT CELL AND A MEASUREMENT CELL ASSEMBLY

(71) Applicant: INFICON AG, Balzers (LI)

(72) Inventor: Felix Mullis, Flums (CH)

(73) Assignee: INFICON AG, Balzers (LI)

( * ) Notice: Subject to any disclaimer, the term of this patent is extended or adjusted under 35 U.S.C. 154(b) by 498 days.

(21) Appl. No.: 17/800,519

(22) PCT Filed: Feb. 18, 2020

(86) PCT No.: PCT/EP2020/054239
§ 371 (c)(1),
(2) Date: Aug. 17, 2022

(87) PCT Pub. No.: WO2021/164853
PCT Pub. Date: Aug. 26, 2021

(65) Prior Publication Data
US 2023/0127344 A1    Apr. 27, 2023

(51) Int. Cl.
*G01L 9/00* (2006.01)
*G01L 9/12* (2006.01)
*G01L 21/00* (2006.01)

(52) U.S. Cl.
CPC .............. *G01L 9/0072* (2013.01); *G01L 9/12* (2013.01); *G01L 21/00* (2013.01)

(58) Field of Classification Search
CPC .......... G01L 9/0072; G01L 9/12; G01L 21/00
(Continued)

(56) References Cited

U.S. PATENT DOCUMENTS 5,838,599 A * 11/1998 Tao ....................... G05B 13/042
                                                                    708/304
2016/0223418 A1 * 8/2016 Wüest .................... G01M 99/00
(Continued)

FOREIGN PATENT DOCUMENTS

EP            0612149 B1 *  6/1998
EP            3197050 A1 *  7/2017   ........... H03H 17/026
(Continued)

OTHER PUBLICATIONS

English translation of International Preliminary Report on Patentability in co-pending International Application No. PCT/EP2020/054239, dated Aug. 23, 2022, in 7 pages.

*Primary Examiner* — Xin Y Zhong
*Assistant Examiner* — Monica S Young
(74) *Attorney, Agent, or Firm* — Procopio, Cory, Hargreaves & Savitch LLP (57) ABSTRACT

The invention relates to a method and to a measurement cell assembly for determining a pressure in a pressure cell (2) are given, wherein the method consists in that a measurement signal (x) is determined, which is at least proportional to a measured pressure in the pressure cell (2), and in that the measurement signal (x) is filtered by means of a first filter unit (10) having a low-pass characteristic in order to produce an output signal (y), wherein the low-pass characteristics of the first filter unit (10) is defined by means of a first damping factor ($\alpha_1$). The method is characterized in that an input difference (x_diff), which results from a difference between the output signal (y) and the measurement signal (x), is filtered by means of a second filter unit (20) having a low-pass characteristic to determine an output difference, wherein the low-pass characteristic of the second filter unit (20) is defined by means of a second damping factor ($\alpha_2$), and in that the first damping factor ($\alpha_1$) of the first filter unit (Continued)

(10) is determined on the basis of the output difference of the second filter unit (20).

22 Claims, 3 Drawing Sheets

(58) Field of Classification Search
USPC .......................................................... 73/724
See application file for complete search history.

(56) References Cited

U.S. PATENT DOCUMENTS

2016/0341618 A1* 11/2016 Mullis ..................... G01L 21/00
2018/0259360 A1* 9/2018 Mullis ..................... G01L 19/12

FOREIGN PATENT DOCUMENTS

| WO | 2015/070906 A1 | 5/2015 |
| WO | 2016/180547 A1 | 11/2016 |

* cited by examiner

METHOD FOR DETERMINING A PRESSURE IN A PRESSURE MEASUREMENT CELL AND A MEASUREMENT CELL ASSEMBLY

CROSS-REFERENCE TO RELATED APPLICATIONS

This application is a U.S. National Stage entry of PCT Application No: PCT/EP2020/054239 filed Feb. 18, 2020, the contents of which are incorporated herein by reference.

The present invention relates to a method for determining a pressure in a pressure cell according to the preamble of claim 1, and to a measurement cell assembly according to the preamble of claim 12.

It is known to measure pressures or pressure differences by applying pressure to a thin membrane and measuring its resulting deflection. A known and suitable method to measure the deflection of such membranes is that the membrane arrangement is formed as a variable electrical capacitance, wherein the change in capacitance, which correlates with the change in pressure, is evaluated via measuring electronics. The capacitance is formed by arranging the thin, flexible membrane surface at a small distance from another surface of a body, and by making both opposing surfaces electrically conductive. If the membrane and the body are made of non-conductive dielectric material, the surfaces are coated with an electrically conductive coating for this purpose, for example, thereby forming capacitor electrodes. The membrane and/or the body can also themselves be made of electrically conductive material, in which case the surfaces again form the capacitor electrodes. When pressure is applied to the membrane, the distance between the two electrodes changes as a result of the deflection, leading to an evaluable change in capacitance. Sensors of this type are manufactured in large quantities, for example from silicon. Both the flat base body and the membrane are often made entirely of silicon. There are also versions with a combined material composition, e.g. silicon with a glass base. The sensors can thus be manufactured at low cost. Pressure sensors of this type can usually only be used for higher pressure ranges in the range from approx. $10^{-1}$ mbar up to several bar. High resolution at lower pressures from about $10^{-1}$ mbar can no longer be achieved with silicon as a material. Sensors of this type are not suitable for typical vacuum applications. For the various vacuum processes to be controlled, measurements of the pressure in the vacuum are often carried out in the range between atmosphere and $10^{-6}$ mbar. Such measurements require a high sensitivity with high resolution and good reproducibility of the vacuum pressure measurement, for which purpose only specially designed measurement cells are capable of, which completely deviate from the design of the high-pressure measurement cell.

Capacitive membrane pressure measurement cells made of corrosion-resistant materials such as $Al_2O_3$ are particularly suitable for vacuum pressure measurement. EP 1 070 239 B1 describes a known capacitive vacuum measurement cell which is essentially made entirely of ceramic and is therefore highly corrosion-resistant. In order to be able to measure very low pressures of up to $10^{-6}$ mbar with high accuracy, a very thin ceramic membrane of, for example, 60 µm thickness is used, which is arranged stress-free and symmetrically in a ceramic housing.

The distance between the capacitor electrodes or the membrane surfaces and the surface of the housing body is preferably in the range of 2 to 50 µm. The diameters of such membrane pressure measurement cells are preferably in the range of 5 to 80 mm. The capacitances thus formed and to be measured are in the range of 10 pF and 32 pF. Thanks to the new electronics, it is now possible measure capacitances in the range from 5 pF to 1000 pF. The measured capacitance serves here as a measure for the pressure to be measured. When the membrane is bent as a function of pressure, this capacitance changes accordingly, allowing the pressure applied to the membrane to be measured. This capacitance measurement must be very precise and is not easy with the small capacitance values, since the small capacitances mean that the changes in capacitance caused by pressure changes are also extremely small. As a result, the electrical signals generated or derived from this are also extremely small and therefore susceptible to interference.

Therefore, correspondingly high demands are placed on signal processing systems for processing pressure signals according to the above explanations. In addition, filter algorithms are used to optimize the properties of the measured pressure signals for further use, for example to control the pressure in process chambers. In this context, an attempt is made to specify a filter algorithm that achieves two inherently contradictory goals for processing pressure signals simultaneously: Firstly, a transient process, for example after a step-shaped change in the measured signal, should be completed as quickly as possible, i.e. the output signal of the filter should lead to a stable output signal as quickly as possible. This means that any action that may be necessary due to a change in pressure can be initiated as quickly as possible. Secondly, any noise signal should be suppressed as much as possible by the filter algorithm. Thus, according to the first condition, a filter that is as fast as possible is required, whereas according to the second condition, a slow filter is more desirable.

Numerous attempts are known to specify a filter algorithm and thus a transfer function for a filter to process the measurement signal in order to achieve the two contradictory goals. The known filter algorithms are based on compromises that do not lead to satisfactory results in the present application for pressure measurement with highly sensitive sensors.

In U.S. Pat. No. 5,838,599, a variant is described for a filter that allows both short settling processes with a rapid change in the input signal and a good reduction of noise signal components in the input signal in the settled state.

Further, reference is made to US 2013/0016888 A1, which discloses an elaborate computational method using a linear filter to eliminate noise.

Finally, a method is known from WO 2016/180547 A1, in which two signal filters with different time constants as well as a switching mechanism are described. This switching mechanism causes a switchover from one filter to the other in the signal path depending on the input signal or depending on a change of the input signal. The switching mechanism is based on two function blocks "Fast" and "Slow". The "Fast" block detects fast signal changes, the "Slow" block detects a stable or a slowly changing input signal. The time constant of the "Slow" block is larger than that of the "Fast" block by a large factor (a typical factor is in the order of 1000) due to the system. This is because, in order to be able to decide with sufficient certainty whether a signal is stable or not, a minimum number of measuring points must be analyzed. In contrast, exactly one measured value is sufficient to detect a signal change. As a consequence, the behavior of the known system according to WO 2016/180547 A1 during the transition from a signal change (edge) to a stable value is very unsatisfactory.

It was therefore the object of the present invention to provide an improved method for processing a measurement signal in which a pronounced noise signal suppression is achieved, but at the same time a fast response to significantly changing measurement signals is possible.

This object is solved by the features of claim 1. Advantageous designs as well as a measurement cell assembly with a pressure measurement cell are given in further claims.

The method according to the invention for determining a pressure in a pressure cell is that a measurement signal is determined which is at least proportional to a measured pressure in the pressure cell, and that the measurement signal is filtered with a first filter unit having a low-pass characteristic for generating an output signal, wherein the low-pass characteristic of the first filter unit is defined by a first damping factor.

The method according to the invention is characterized in that an input difference resulting from a difference between the output signal and the measurement signal is filtered with a second filter unit having a low-pass characteristic for determining an output difference, wherein the low-pass characteristic of the second filter unit is defined by a second damping factor, and in that the first damping factor of the first filter unit is determined on the basis of the output difference of the second filter unit.

One embodiment variant of the method according to the invention is characterized in that the first filter unit comprises a first exponential moving average filter.

Further embodiment variants of the method according to the invention are characterized in that the second filter unit comprises a second exponential moving average filter.

Still further embodiment variants of the method according to the invention are characterized in that the measurement signal is present as a discrete-time sampled measurement signal at a point in time represented by a time index and the output signal is likewise present as a discrete-time sampled output signal at a point in time likewise represented by the time index, and in that the first and second filter units are implemented as discrete-time filters.

Still further embodiment variants of the method according to the invention are characterized in that the low-pass characteristic of the first filter unit and/or the second filter unit is or are first order.

Still further embodiment variants of the method according to the invention are characterized in that an absolute value of the output difference is determined in an absolute value unit, in that the absolute value of the output difference is multiplied by a filter effect factor to determine a product, and in that the product of this multiplication is used to determine the first damping factor.

Still further embodiment variants of the method according to the invention are characterized in that the product of the multiplication is limited to a range of values from 0 to 1.

Still further embodiment variants of the method according to the invention are characterized in that the absolute value of the output difference is exponentiated by an exponent before multiplication by the filter effect factor is performed.

Still further embodiment variants of the method according to the invention are characterized in that the filter effect factor lies in a range of values from 0 to $10^{40}$.

Still further embodiment variants of the method according to the invention are characterized in that the exponent is in a range of values from 0 to 10, typically in a range of values from 0.5 to 5, even more typically equal to 2.5.

Still further embodiment variants of the method according to the invention are characterized in that the second damping factor is in a range of values from 0 to 1, typically in a range of values from 0.05 to 0.25, even more typically equal to 0.1.

Further, the present invention is directed to a measurement cell assembly comprising a pressure cell and a membrane pressure measurement cell operatively connected to the pressure cell, which membrane pressure measurement cell generates a pressure-dependent measurement signal which is applied to a first filter unit having a low-pass characteristic for generating an output signal, wherein the low-pass characteristic of the first filter unit is defined by a first damping factor. The measurement cell assembly according to the invention is characterized in that an addition unit is provided, to which the inverted input signal and the output signal are supplied for determining an input difference, in that the input difference of a second filter unit with low-pass characteristic is applied to determine an output difference, wherein the low-pass characteristic of the second filter unit is defined by a second damping factor, and in that the output difference and the second damping factor of the second filter unit are applied to generate the first damping factor which is supplied to the first filter unit.

One embodiment variant of the measurement cell assembly according to the invention is that the first filter unit comprises a first exponential moving average filter.

Further embodiment variants of the measurement cell assembly according to the invention are that the second filter unit comprises a second exponential moving average filter.

Further embodiment variants of the measurement cell assembly according to the invention are that the measurement signal is present as a discrete-time sampled measurement signal at a point in time represented by a time index and the output signal is likewise present as a discrete-time sampled output signal at a point in time likewise represented by the time index, and that the first and second filter units are implemented as discrete-time filters.

Further embodiment variants of the measurement cell assembly according to the invention are that the low-pass characteristic of the first filter unit and/or the second filter unit is or are first order.

Further embodiment variants of the measurement cell assembly according to the invention are that an absolute value unit is provided for determining an absolute value of the output difference and that the absolute value of the output difference and a filter effect factor of a multiplication unit are applied for determining the first damping factor.

Further embodiment variants of the measurement cell assembly according to the invention are that the first damping factor in a limiting unit can be limited to a range of values from 0 to 1.

Further embodiment variants of the measurement cell assembly according to the invention are that a functional unit is provided, to which the absolute value of the output difference and an exponent for generating a potentized output signal are applied.

Further embodiment variants of the measurement cell assembly according to the invention are that the filter effect factor is in a range of values from 0 to $10^{40}$.

Further embodiment variants of the measurement cell assembly according to the invention are that the exponent is in a range of values from 0 to 10, typically in a range of values from 0.5 to 5, even more typically equal to 2.5.

Still further embodiment variants of the measurement cell assembly according to the invention are that the second damping factor is in a range of values from 0 to 1, typically in a range of values from 0.05 to 0.25, even more typically equal to 0.1.

In the following, exemplary embodiments of the present invention are explained in detail with reference to figures, wherein.

Figure 1A:
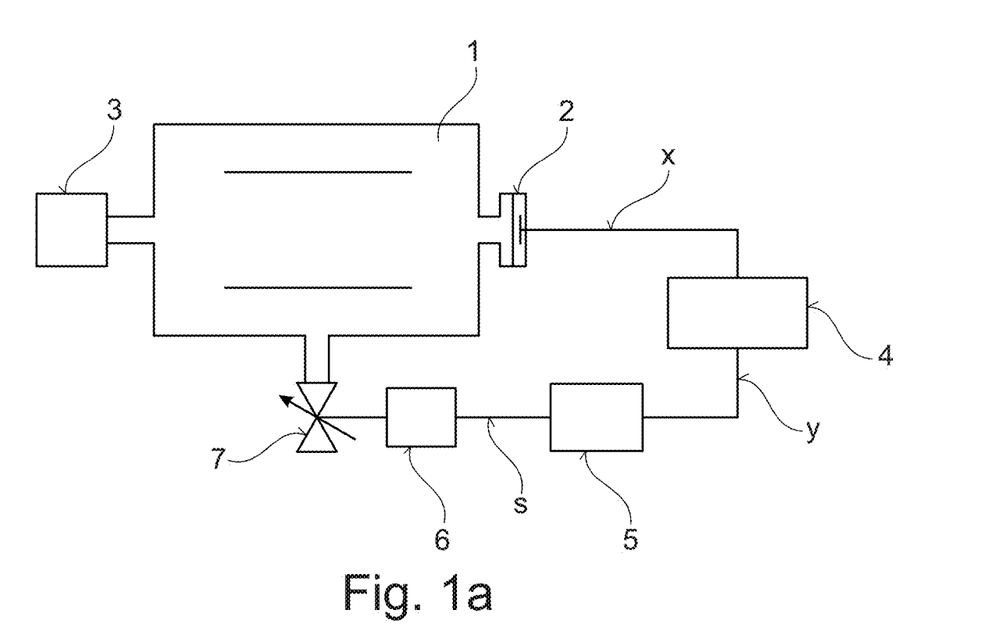
FIGS. 1a and 1b show a measurement cell assembly with a membrane pressure measurement cell connected to a process chamber, with which a measurement signal is determined which, after processing in a signal processing unit according to the invention, is supplied to a valve.

FIG. 1a shows in a highly simplified block diagram a measurement cell assembly with a process chamber 1, a membrane pressure measurement cell 2, a vacuum pump 3, a signal processing unit 4, a control unit 5, a valve actuator 6 and a valve 7. The membrane pressure measurement cell 2 is used to determine the pressure in the process chamber 1, in which a pressure specified in accordance with a vacuum process is set. Vacuum processes include a wide variety of processes, such as coating processes, etching processes, thermal treatment of workpieces, etc. Vacuum processes are often also operated with supporting gases, which are required both actively as reactive gas or inactively as inert gas in the process. For this purpose, the gases are supplied to the process chamber 1 via valve 7, which is controlled by valve actuator 6 and can be used to control the gas supply and the pressure in process chamber 1. A measurement signal x is generated by the membrane pressure measurement cell 2, which is processed in the signal processing unit 4 and the control unit 5 to form a control signal s for the valve actuator 6. For precise process control, it is necessary that the membrane pressure measurement cell 2 measures as precisely as possible on the one hand, but also as quickly as possible on the other hand, in order to be able to react to pressure changes in the process chamber 1 as quickly and precisely as possible.

Figure 1B:
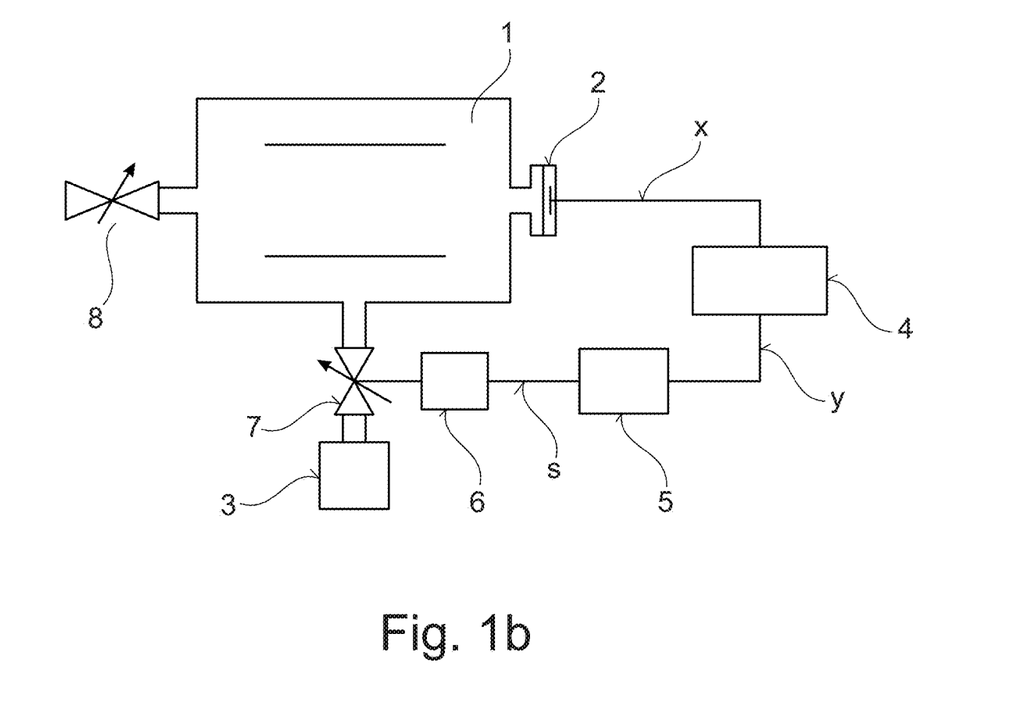

FIG. 1b shows a further simplified block diagram of a measurement cell assembly according to FIG. 1a, but now in a so-called "down-stream pressure control" instead of an "up-stream pressure control". In the down-stream pressure control, the pressure gauge controls the conductance upstream of the vacuum pump via a controllable gas inlet valve 8. In contrast to the up-stream pressure control shown in FIG. 1a, in the down-stream pressure control shown in FIG. 1b, the vacuum pump 3 is connected to valve 7. Furthermore, the process chamber 1 is closed off via the controllable gas inlet valve 8. The gases required in the process chamber 1 are admitted to the process chamber 1 as required via the gas inlet valve 8.

It is also conceivable—in a simplified embodiment of the present invention—that the output signal y of the signal processing unit 4 is not used to control the pressure in a process chamber. It is then not a closed system, but an open system. In this case, a pressure in a pressure cell of any type—similar to the process chamber 1 according to FIG. 1—is measured with a pressure measurement cell 2. The measurement signal x measured with the pressure measurement cell 2 is also processed in a signal processing unit 4 to obtain a stable, noise-free output signal y which nevertheless reacts quickly to changes.

The invention now relates—again with regard to the embodiment variant according to FIG. 1—to the processing of the measurement signal x in the context of the conditions existing in a vacuum process and is primarily intended for optimum signal processing of the measurement signal x, as it can occur as a pressure signal in such vacuum processes. In this connection, the signal processing in the signal processing unit 4 can basically be carried out in an analog or digital manner, wherein the special precautions when signal processing is carried out in an analog manner or in a digital manner will not be discussed further in the following, since such precautions (analog/digital conversion, filtering to avoid aliasing, selection of the sampling frequency, etc.) are sufficiently known to the person skilled in the art.

The output signal y of the signal processing unit 4 is further processed in the control unit 5, for example with a so-called P, PI, PID or state controller. The controller implemented in the control unit 5 is responsible in particular for the optimum tracking of the control signal s for the valve actuator 6 or for the valve 7.

In principle, the explanations regarding the processes in the signal processing unit 4 and its block diagrams are valid both for the embodiment variant in a closed system and for the embodiment variant in an open system.

Figure 2:
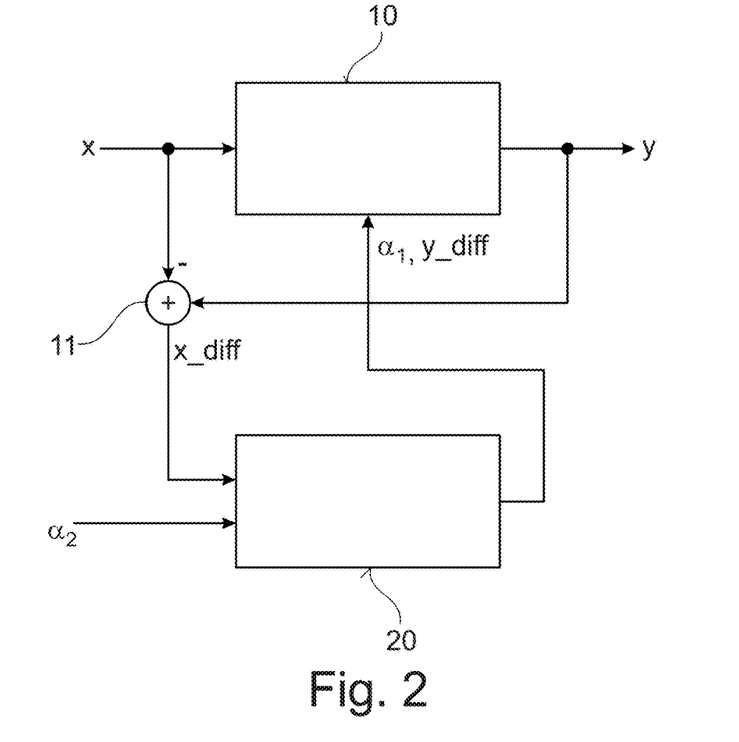
FIG. 2 shows a block diagram of a first embodiment variant according to the present invention, in particular for implementation in the signal processing unit according to FIG. 1.

FIG. 2 shows in a schematic and simplified manner a block diagram of the processing steps according to the invention, which are processed in the signal processing unit 4. To implement the individual processing steps of the algorithm according to the invention, which is still to be explained, a signal processor is used, for example, which is programmed accordingly. It is understood that other tasks can also be performed by the signal processor, provided that the processor capacity is sufficient for this purpose. In particular, it is conceivable that the controller of the control unit 5 is also implemented in the same signal processor.

As can be seen from FIG. 2, the measurement signal x is fed to a first filter unit 10, which generates the output signal y. The first filter unit 10 with the measurement signal x and the output signal y form the actual signal path of the signal processing unit 4 (FIG. 1). The other components to be explained, such as a second filter unit 20 and an addition unit 11, are provided for defining the characteristics of the first filter unit 10.

The first filter unit 10 has a filter characteristic defined in a discrete-time system according to the following equation, for example:

$$y_k = \alpha \cdot x_k + (1-\alpha) \cdot y_{k-1}$$

Here, $y_k$ is the time-discrete output signal, $x_k$ is the time-discrete measurement signal, k is a time-dependent index, and $\alpha_1$ is a variable whose value decisively determines the time constant of the first filter unit 10 and is also referred to as the damping factor $\alpha_1$. The aim of the present invention is the optimum setting of the value for the damping factor $\alpha_1$, namely in such a way that a noise signal in the measurement signal $x_k$ is suppressed or even eliminated as far as possible, but at the same time a changing pressure in the process chamber 1 (FIG. 1) is quickly detected in order to be able to react to it correspondingly quickly.

The mentioned equation with the damping factor $\alpha_1$ has a low-pass characteristic as the filter characteristic for suppressing the noise signal component, wherein the time constant $\tau$ for a first-order filter at a sampling interval T can be determined as follows:

$$\tau = T \cdot \frac{1-\alpha_1}{\alpha_1}$$

The choice of values for the damping factor $\alpha_1$ is crucial for the present invention. If the measurement signal $x_k$ contains only a noise signal at a stable pressure value, the value for $\alpha_1$ is rather small, for example 0.0001. Thus, the noise signal present in the measurement signal $x_k$ is suppressed to a maximum and the filtered output signal $y_k$ is excellently suited for use in the downstream controller of the control unit 5 (FIG. 1), because a stable output signal leads to a lower activity of the valve actuator 6 or the valve 7 and thus to a reduced load on these components, which considerably reduces their probability of failure compared to known systems.

On the other hand, a change in the measurement signal $x_k$ due to an actual pressure change in the process chamber 1 (FIG. 1) is to be detected without delay, which necessitates a different value for the damping factor $\alpha_1$, namely, for example, a value for $\alpha_1$ greater than 0.3.

According to the invention, the value for the damping factor $\alpha_1$ is adjusted as a function of the difference between the output signal and the measurement signal. Starting from a discrete-time system in which the first filter unit 10 has a first-order low-pass filter according to the formula below, $$y_k = \alpha_1 \cdot x_k + (1-\alpha_1) \cdot y_{k-1}$$

the damping factor $\alpha_1$ is determined via an input difference x_diff or, in the discrete-time system, via $x\_diff_k$ by determining—as can be seen from the analog system shown in FIG. 2—the difference between $y_{k-1}$ and $x_k$ with the addition unit 11 as follows:

$$x\_diff_k = y_{k-1} - x_k$$

The input difference $x\_diff_k$ is fed to the second filter unit 20, in which the first damping factor $\alpha_1$ is determined via a second damping factor $\alpha_2$. The second filter unit 20 again has, for example, first-order low-pass characteristics. Higher orders of low-pass filter characteristic are also conceivable. For first-order low-pass filter characteristics, in the case of a discrete-time system, the equation $$\alpha_{1k} = \alpha_2 \cdot x\_diff_k + (1-\alpha_2) \cdot \alpha_{1k-1}$$

is applicable, wherein a second damping factor $\alpha_2$ is predefined. For example, the second damping factor $\alpha_2$ is in the range 0 to 1, more specifically in the range 0.05 to 0.25, even more specifically equal to 0.1.

Reference is made to the general fact that the damping factor $\alpha$ of a filter, in particular a first-order filter, can be expressed directly by the cutoff frequency $f_c$ and vice versa for those skilled in the technical field of filter design, whether in analog or discrete-time space. For a sampling interval T, the following formula is obtained for a first-order filter:

$$\alpha = \frac{2 \cdot \pi \cdot T \cdot f_c}{1 + 2 \cdot \pi \cdot T \cdot f_c}$$

or vice versa:

$$f_c = \frac{\alpha}{2 \cdot \pi \cdot T \cdot (1-\alpha)}$$

This applies to both the first filter unit 10 and the second filter unit 20.

Figure 3:
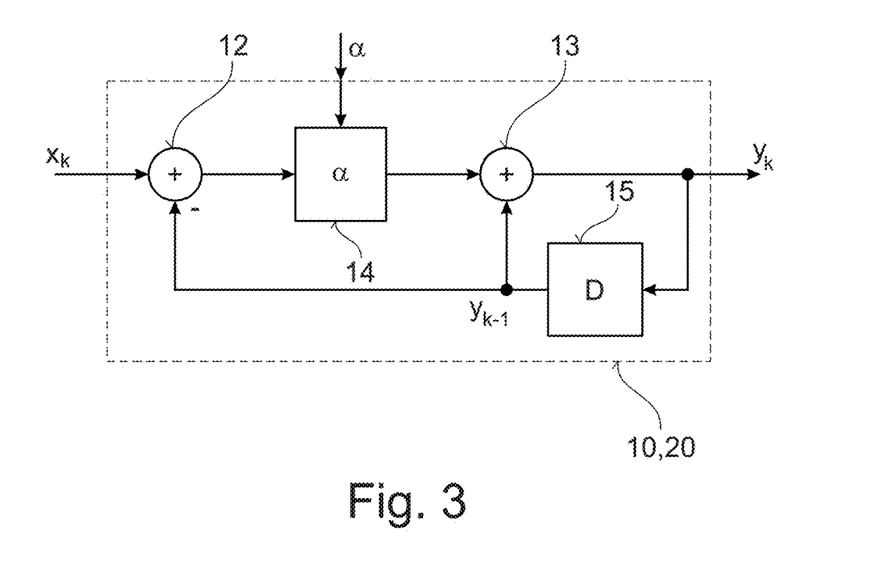
FIG. 3 shows a block diagram of a per se known exponential moving average filter of the first-order low-pass filter type as a discrete-time transfer function, in particular for use in a first and/or in a second filter unit according to FIG. 2.

FIG. 3 shows the block diagram of a well-known exponential moving average filter of the first-order low-pass filter type as a discrete-time transfer function. The formula already mentioned applies:

$$y_k = \alpha \cdot x_k + (1-\alpha) \cdot y_{k-1}$$

wherein k is the index for time (and corresponding to k−1 a time delayed by a sampling interval T) and $\alpha$ is the damping factor.

Following the above formula, the block diagram shown in FIG. 3 is obtained with first and second adders 12, 13, a delay unit 15, and the damping unit 14, in which an output signal of the first adder 12 is multiplied by the damping factor $\alpha$. An output signal of the damping unit 14 is applied to the second adder 13 in which it is summed with the delayed output signal $y_{k-1}$ to produce the output signal $y_k$. Finally, the output signal of the first adder 12 is formed by adding the input signal $x_k$ and the inverted delayed output signal $y_{k-1}$.

The block diagram of the exponential moving average filter shown in FIG. 3 applies in principle to both the first filter unit 10 and the second filter unit 20.

Figure 4:
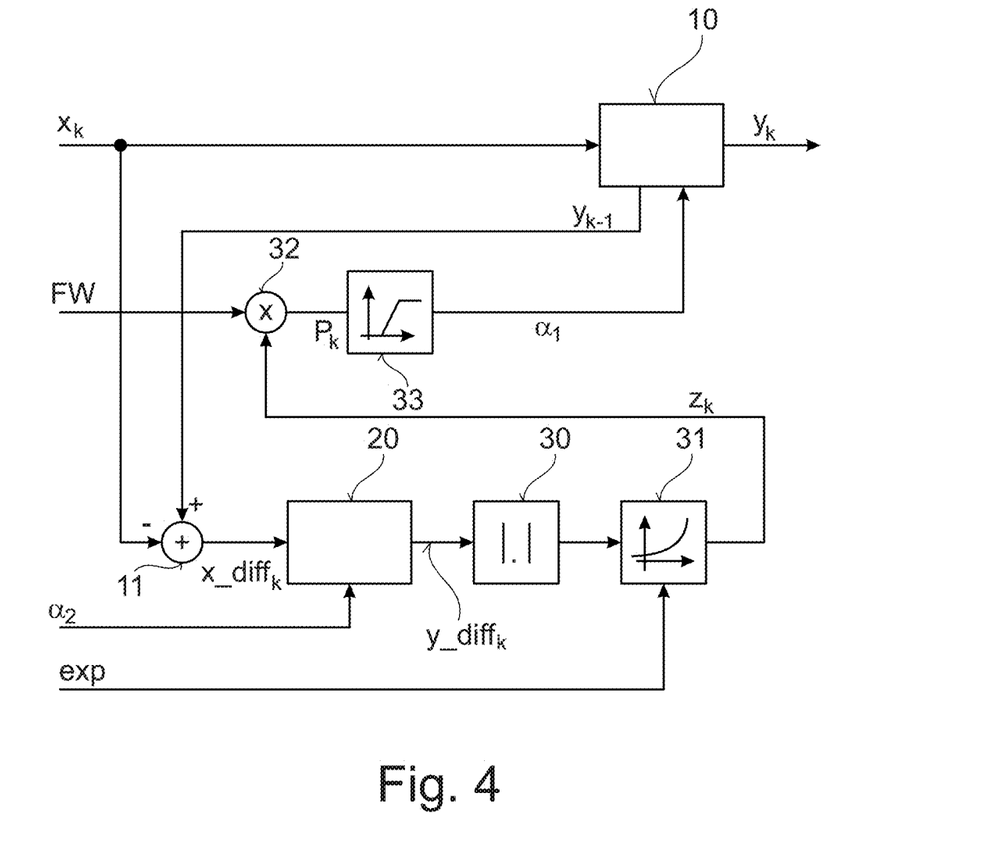
FIG. 4 shows a block diagram of a further embodiment variant of the present invention, in particular for implementation in the signal processing unit according to FIG. 1.

FIG. 4 shows a further embodiment variant of the present invention, again using a block diagram. The measurement signal $x_k$ is again applied to a first filter unit 10 to generate the output signal $y_k$. The first filter unit 10 again has first-order low-pass characteristics, although a higher-order filter can also be used.

As in the first embodiment variant of the present invention, which has been described with reference to FIG. 2, an addition unit 11 is provided in which the input difference $x\_diff_k$ is generated by subtracting the input signal $x_k$ from the output signal $y_{k-1}$. The input difference $x\_diff_k$ is in turn applied to the second filter unit 20. The second filter unit 20 again has first-order low-pass characteristics, although a higher-order filter can also be used here.

The further embodiment variant of the invention shown in FIG. 4 is now, on the one hand, that the output difference $y\_diff_k$ determined with the second filter unit 20 is applied to an absolute value unit 30 in which the absolute value of $y\_diff_k$, i.e. $|y\_diff_k|$, is determined. The absolute value $|y\_diff_k|$ is applied to a functional unit 31 in which a function in the general form of a polynomial is applied to the absolute value $|y\_diff_k|$. A simplified function is, for example, the function implemented in the function unit 30 below:

$$z_k = |y\_diff_k|^{exp}$$

wherein an exponent exp is, for example, in the range 0 to 10, typically in the range 0.5 to 5, or even more typically equal to 2.5. It is self-evident that $$z_k = |y\_diff_k|$$

if exp=1, i.e. the embodiment variant according to FIG. 4 changes into the embodiment variant according to FIG. 2, in which the functional unit 31 can be regarded as not present.

The output value $z_k$ and a filter effect factor FW are fed to the multiplication unit 32, in which multiplication is performed to determine a product $p_k$, which is fed to a limiting unit 33 for limiting to a value in the range 0 to 1. Thus, the first damping factor $\alpha_1$ of the first filter unit 10 is determined.

The function performed in the limiting unit 33 can be formally described as follows:

$$\alpha_1 = \begin{cases} 1, & \text{if } z_k \cdot FW \geq 1 \\ z_k \cdot FW, & \text{if } 0 < z_k \cdot FW \leq 1 \\ 0, & \text{if } z_k \cdot FW \leq 0 \end{cases}$$

It has been shown that the filter effect factor FW can be freely selected in the range from 0 to $10^{40}$.

Finally, the second damping factor $\alpha_2$ is chosen in the range of 0 to 1, typically in the range of 0.05 to 0.25, even more typically equal to 0.1.

Thus, the embodiment variant according to FIG. 4 comprises three predeterminable parameters: the filter effect factor FW, the second damping factor $\alpha_2$ and the exponent exp.

Of the three predeterminable parameters, the filter effect factor FW and the exponent exp are of particular importance. These two parameters have a decisive influence on the filter behavior: While the sensitivity of the filter can be adjusted via the exponent exp, the filter effect—as the name already expresses—can be adjusted via the filter effect factor FW, wherein the filter effect factor FW influences the noise component in the signal.

LIST OF REFERENCE SIGNS

1 Process chamber
2 Membrane pressure cell
3 Vacuum pump
4 Signal processing unit
5 Control unit
6 Valve actuator
7 Valve
8 Gas inlet valve
10 First filter unit
11 Addition unit
12 First adder
13 Second adder
14 Damping unit
15 Delay unit
20 Second filter unit
30 Absolute value unit
31 Functional unit
32 Multiplication unit
33 Limiting unit
x Measurement signal
y Output signal
s Control signal
x_diff Input difference
y_diff Output difference
$\alpha$ Damping factor
$\alpha_1$, $\alpha_2$ First and second damping factor
FW Filter effect factor
Exp Exponent
$z_k$ Potentized output signal

The invention claimed is:

1. Method for determining a pressure in a pressure cell (2), wherein the method consists of the following:
   that a measurement signal (x) is determined which is at least proportional to a measured pressure in the pressure cell (2), and
   that the measurement signal (x) is filtered with a first filter unit (10) having a low-pass characteristic for generating an output signal (y), wherein the low-pass characteristic of the first filter unit (10) is defined by a first damping factor ($\alpha_1$),
characterized
   in that an input difference (x_diff) resulting from a difference between the output signal (y) and the measurement signal (x) is filtered with a second filter unit (20) having a low-pass characteristic for determining an output difference (y_diff), wherein the low-pass characteristic of the second filter unit (20) is defined by a second damping factor ($\alpha_2$), and
   in that the first damping factor ($\alpha_1$) of the first filter unit (10) is determined on the basis of the output difference (y_diff) of the second filter unit (20).

2. Method according to claim 1, characterized in that the first filter unit (10) comprises a first exponential moving average filter.

3. Method according to claim 1, characterized in that the second filter unit (10) comprises a second exponential moving average filter.

4. Method according to claim 1, characterized in that the measurement signal (x) is present as a discrete-time sampled measurement signal ($x_k$) at a time represented by a time index (k) and the output signal (y) is likewise present as a discrete-time sampled output signal ($y_k$) at a time likewise represented by the time index (k), and in that the first and second filter units (10, 20) are implemented as discrete-time filters.

5. Method according to claim 1, characterized in that the low-pass characteristic of the first filter unit (10) and/or the second filter unit (20) is or are first order.

6. Method according to claim 1, characterized in that an absolute value of the output difference ($y\_diff_k$) is determined in an absolute value unit (30), in that the absolute value of the output difference ($y\_diff_k$) is multiplied by a filter effect factor (FW) for determining a product, and in that the product of this multiplication is used for determining the first damping factor ($\alpha_1$).

7. Method according to claim 6, characterized in that the product of the multiplication is limited to a range from 0 to 1.

8. Method according to claim 6, characterized in that the absolute value of the output difference ($y\_diff_k$) is exponentiated by an exponent (exp) before multiplication by the filter effect factor (FW) is performed.

9. Method according to claim 8, characterized in that the exponent (exp) is in a range of values from 0 to 10, typically in a range of values from 0.5 to 5, even more typically equal to 2.5.

10. Method according to claim 6, characterized in that the filter effect factor (FW) lies in a value range from 0 to $10^{40}$.

11. Method according to claim 1, characterized in that the second damping factor ($\alpha_2$) is in a range of values from 0 to 1, typically in a range of values from 0.05 to 0.25, even more typically equal to 0.1.

12. Measurement cell assembly having a pressure cell (2) and a membrane pressure measurement cell (2) which is operatively connected to the pressure cell (2) and generates a pressure-dependent measurement signal (x) which is applied to a first filter unit (10) having a low-pass characteristic in order to generate an output signal (y), wherein the low-pass characteristic of the first filter unit (10) is defined by a first damping factor ($\alpha_1$),
   characterized
      in that an addition unit (11) is provided, to which the inverted input signal (x) and the output signal (y) are supplied for determining an input difference (x_diff), in that the input difference (x_diff) of a second filter unit (20) with low-pass characteristic is applied to determine an output difference (y_diff), wherein the low-pass characteristic of the second filter unit (20) is defined by a second damping factor ($\alpha_2$), and in that the output difference (y_diff) and the second damping factor ($\alpha_2$) of the second filter unit (20) are applied to generate the first damping factor ($\alpha_1$) which is supplied to the first filter unit (10).

13. Measurement cell assembly according to claim 12, characterized in that the first filter unit (10) comprises a first exponential moving average filter.

14. Measurement cell assembly according to claim 12, characterized in that the second filter unit (10) comprises a second exponential moving average filter.

15. Measurement cell assembly according to claim 12, characterized in that the measurement signal (x) is present as a discrete-time sampled measurement signal ($x_k$) at a time represented by a time index (k) and the output signal (y) is likewise present as a discrete-time sampled output signal ($y_k$) at a time likewise represented by the time index (k), and in that the first and second filter units (10, 20) are implemented as discrete-time filters.

16. Measurement cell assembly according to claim 12, characterized in that the low-pass characteristic of the first filter unit (10) and/or the second filter unit (20) is or are first order.

17. Measurement cell assembly according to claim 12, characterized in that an absolute value unit (30) for determining an absolute value of the output difference ($y\_diff_k$) is present, and in that the absolute value of the output difference ($y\_diff_k$) and a filter effect factor (FW) of a multiplication unit (32) for determining the first damping factor ($\alpha_1$) are applied.

18. Measurement cell assembly according to claim 17, characterized in that the first damping factor ($\alpha_1$) in a limiting unit (33) can be limited to a range of values from 0 to 1.

19. Measurement cell assembly according to claim 17, characterized in that a functional unit (31) is provided which is supplied with the absolute value of the output difference ($y\_diff_k$) and with an exponent (exp) for generating a potentized output signal ($z_k$).

20. Measurement cell assembly according to claim 17, characterized in that the filter effect factor (FW) lies in a value range from 0 to $10^{40}$.

21. Measurement cell assembly according to claim 17, characterized in that the exponent (exp) is in a range of values from 0 to 10, typically in a range of values from 0.5 to 5, even more typically equal to 2.5.

22. Measurement cell assembly according to claim 12, characterized in that the second damping factor ($\alpha_2$) is in a range of values from 0 to 1, typically in a range of values from 0.05 to 0.25, even more typically equal to 0.1.

* * * * *